United States Patent
Honda

(10) Patent No.: US 10,564,905 B2
(45) Date of Patent: Feb. 18, 2020

(54) IMAGE FORMING APPARATUS

(71) Applicant: Oki Data Corporation, Tokyo (JP)

(72) Inventor: Akihiro Honda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/013,801

(22) Filed: Jun. 20, 2018

(65) Prior Publication Data

US 2019/0004754 A1   Jan. 3, 2019

(30) Foreign Application Priority Data

Jun. 30, 2017 (JP) ................. 2017-128694

(51) Int. Cl.
*G06F 3/12* (2006.01)
*H04N 1/00* (2006.01)

(52) U.S. Cl.
CPC .......... *G06F 3/1241* (2013.01); *G06F 3/1206* (2013.01); *G06F 3/1213* (2013.01); *G06F 3/1247* (2013.01); *G06F 3/1282* (2013.01); *G06F 3/1297* (2013.01); *H04N 1/00567* (2013.01); *G06F 3/1251* (2013.01); *G06F 2206/1514* (2013.01)

(58) Field of Classification Search
None
See application file for complete search history.

(56) References Cited

U.S. PATENT DOCUMENTS

| | | | |
|---|---|---|---|
| 2008/0258372 A1* | 10/2008 | Nakane | B42C 1/12 270/58.08 |
| 2011/0317208 A1* | 12/2011 | Kaneda | G06F 3/1212 358/1.15 |
| 2012/0206524 A1* | 8/2012 | Hirosawa | B41J 2/1652 347/14 |

FOREIGN PATENT DOCUMENTS

JP    2011-062979 A    3/2011

* cited by examiner

*Primary Examiner* — Fan Zhang
(74) *Attorney, Agent, or Firm* — Rabin & Berdo, P.C.

(57) ABSTRACT

An image forming apparatus includes an image data generator, a conveyor conveying a print medium, a determiner, a print medium cutter, a printing section, and a printing controller. The image data generator performs, sequentially on a page basis, conversion of print data corresponding to pages included in a print job into image data. The determiner determines a specified number of pages. The print medium cutter cuts the print medium into media for each of the specified number of pages. The printing section performs, on the print medium, printing of an image-data-based image. The printing controller causes the printing section to start the printing of the image corresponding at least to the specified number of pages, after the conversion of the print data into the image data corresponding at least to the specified number of pages and before that into the image data corresponding to all of pages.

6 Claims, 8 Drawing Sheets

IMAGE FORMING APPARATUS

CROSS REFERENCE TO RELATED APPLICATIONS

The present application claims priority from Japanese Patent Application No. 2017-128694 filed on Jun. 30, 2017, the entire contents of which are hereby incorporated by reference.

BACKGROUND

The technology relates, for example, to an image forming apparatus suitable for a printer such as a page printer that performs printing on a long print medium, such as continuous paper or roll paper.

Examples of an image forming apparatus include a page printer that is enabled to perform continuous printing of a plurality of pages with the use of a long print medium, such as continuous paper or roll paper. Typically, an existing image forming apparatus of this type performs printing while conveying a continuous print medium, and once printing starts, the image forming apparatus is unable to stop the conveyance of the print medium during printing. Therefore, when the supply of image data fails to catch up during printing, a blank page may be output between a print page and another print page, or an overrun may be detected at a position irrelevant to a dividing position in the continuous printing, which may cause the image forming apparatus to enter an error state and to become unable to continue with the printing. Accordingly, in a case where a print job that includes print data corresponding to a plurality of pages is to be executed, typically, such print control is carried out in which print data corresponding to all of the pages is edited and expanded into image data for printing and printing starts being executed after generation of image data corresponding to all of the pages is completed.

For example, reference is made to Japanese Unexamined Patent Application Publication No. 2011-062979.

SUMMARY

Starting the execution of printing after the generation of the image data corresponding to all pages is completed leads to an increase in the amount of time to be spent before the start of the printing.

It is desirable to provide such an image forming apparatus that allows for reduction of time required for printing while suppressing an overrun in print medium conveyance.

According to one embodiment of the technology, there is provided an image forming apparatus that includes an image data generator, a conveyor, a determiner, a print medium cutter, a printing section, and a printing controller. The image data generator performs, sequentially on a page basis, conversion of print data corresponding to a plurality of pages included in a print job into image data. The conveyor conveys, in a predetermined conveying direction, a print medium on which printing of the image data corresponding to the plurality of pages is performed. The determiner determines a specified number of pages. The print medium cutter cuts the print medium conveyed by the conveyor into print media for each of the specified number of pages. The printing section performs, on the print medium conveyed by the conveyor, printing of an image that is based on the image data. The printing controller causes the printing section to start execution of the printing of the image corresponding at least to the specified number of pages, after the conversion of the print data into the image data corresponding at least to the specified number of pages is completed by the image data generator and before the conversion of the print data into the image data corresponding to all of pages included in the print job is completed by the image data generator.

According to one embodiment of the technology, there is provided another image forming apparatus that includes an image data generator, a conveyor, a determiner, a print medium cutter, a printing section, and a printing controller. The image data generator performs, sequentially on a page basis, conversion of print data corresponding to a plurality of pages included in a print job into image data. The conveyor conveys, in a predetermined conveying direction, a print medium on which printing of the image data corresponding to the plurality of pages is performed. The determiner determines a specified number of pages. The print medium cutter cuts the print medium conveyed by the conveyor into print media for each of the specified number of pages. The printing section performs, on the print medium conveyed by the conveyor, printing of an image that is based on the image data. The printing controller causes the printing section to stand by for execution of the printing of the image corresponding at least to the specified number of pages, until the conversion of the print data into the image data corresponding at least to the specified number of pages is completed by the image data generator and before the conversion of the print data into the image data corresponding to all of pages included in the print job is completed by the image data generator.

DETAILED DESCRIPTION

Figure 1:
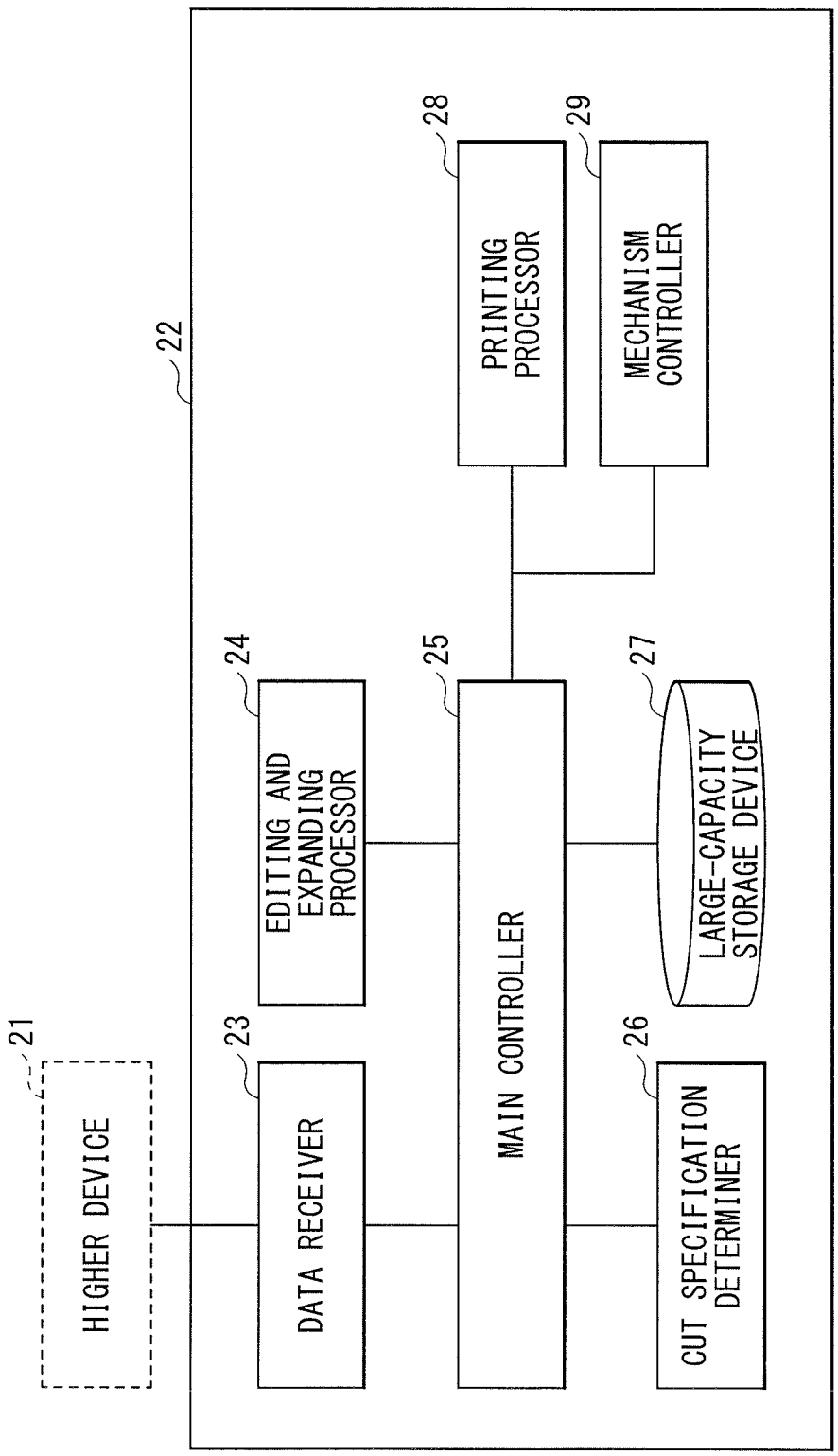
FIG. 1 is a block diagram illustrating an example of a configuration of a control system in an image forming apparatus according to one example embodiment of the technology.

Hereinafter, example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The technology will be described in the following order.

1. First Example Embodiment (FIG. 1 to FIG. 4)
   1.0 Overview
   1.1 Configuration
   1.2 Operation
   1.3 Example Effects
2. Second Example Embodiment (FIG. 5 to FIG. 8)
   2.0 Overview
   2.1 Configuration
   2.2 Operation
   2.3 Example Effects
3. Other Example Embodiments 1. First Example Embodiment

[1.0 Overview]

An image forming apparatus according to one example embodiment of the technology may include an image data generator, a conveyor, a determiner, a print medium cutter, a printing section, and a printing controller. The image data generator performs, sequentially on a page basis, conversion of print data corresponding to a plurality of pages included in a print job into image data. The conveyor conveys, in a predetermined conveying direction, a print medium on which printing of the image data corresponding to the plurality of pages is performed. The determiner determines a specified number of pages. The print medium cutter cuts the print medium conveyed by the conveyor into print media for each of the specified number of pages. The printing section performs, on the print medium conveyed by the conveyor, printing of an image that is based on the image data. The printing controller causes the printing section to start execution of the printing of the image corresponding at least to the specified number of pages, after the conversion of the print data into the image data corresponding at least to the specified number of pages is completed by the image data generator and before the conversion of the print data into the image data corresponding to all of pages included in the print job is completed by the image data generator.

In the image forming apparatus according to one example embodiment of the technology, the printing controller may cause the printing section to stand by for execution of the printing of the image corresponding at least to the specified number of pages, until the conversion of the print data into the image data corresponding at least to the specified number of pages is completed by the image data generator and before the conversion of the print data into the image data corresponding to all of pages included in the print job is completed by the image data generator.

Figure 2:
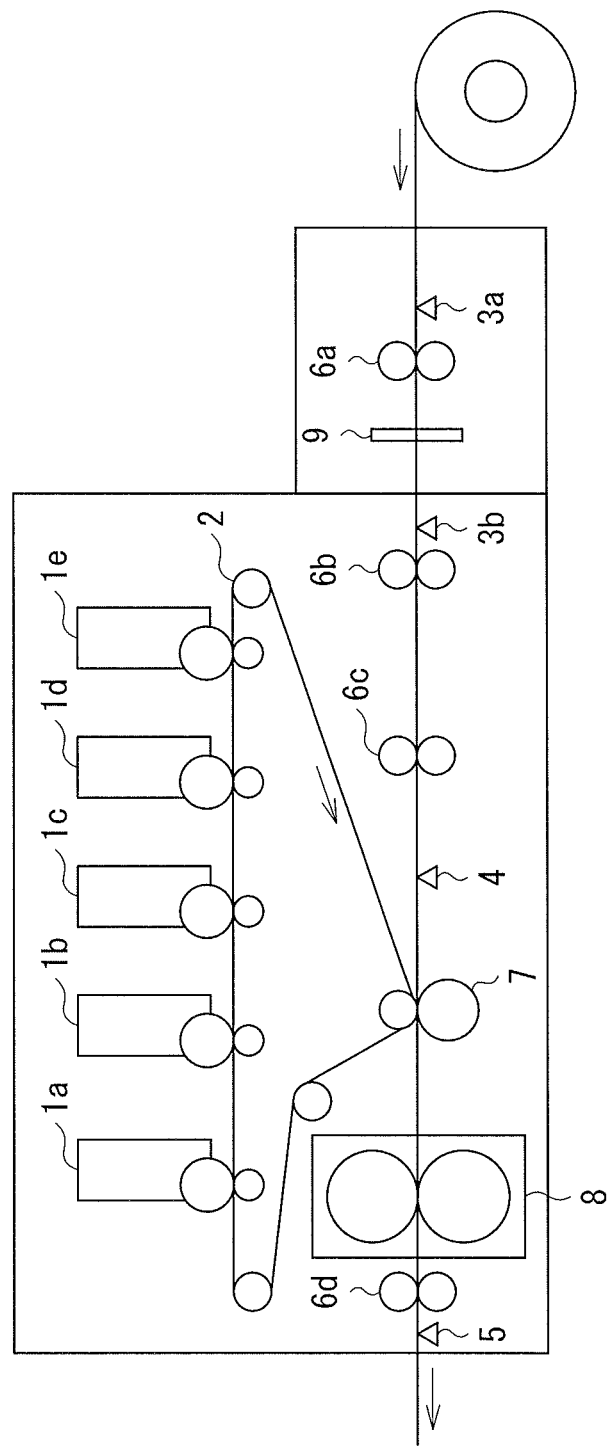
FIG. 2 is a diagram illustrating an example of a configuration of a mechanism system in the image forming apparatus according to one example embodiment.

The image forming apparatus according to one example embodiment of the technology may be embodied, as a specific but non-limiting example, by an image forming apparatus 22, which is illustrated in FIG. 1 and FIG. 2 and will be described later. The image data generator may be embodied, as a specific but non-limiting example, by an editing and expanding processor 24, which is illustrated in FIG. 1 and will be described later. The conveyor may be embodied, as a specific but non-limiting example, by print medium conveyors 6a, 6b, 6c, and 6d, which are illustrated in FIG. 2 and will be described later. The determiner may be embodied, as a specific but non-limiting example, by a cut specification determiner 26, which is illustrated in FIG. 1 and will be described later. The print medium cutter may be embodied, as a specific but non-limiting example, by a cutter 9, which is illustrated in FIG. 2 and will be described later. The printing section may be embodied, as a specific but non-limiting example, by a secondary transfer section 7, which is illustrated in FIG. 2 and will be described later. The printing controller may be embodied, as a specific but non-limiting example, by a main controller 25, which is illustrated in FIG. 1 and will be described later. In the image forming apparatus according to one example embodiment of the technology, the specified number of pages may be, as a specific but non-limiting example, the number of cut pages (Nc), which will be described later.

In the image forming apparatus according to one example embodiment of the technology, the print medium cutter may cut the print medium upstream in the predetermined conveying direction from a position where the printing of the image onto the print medium is executed by the printing section.

Figure 4:
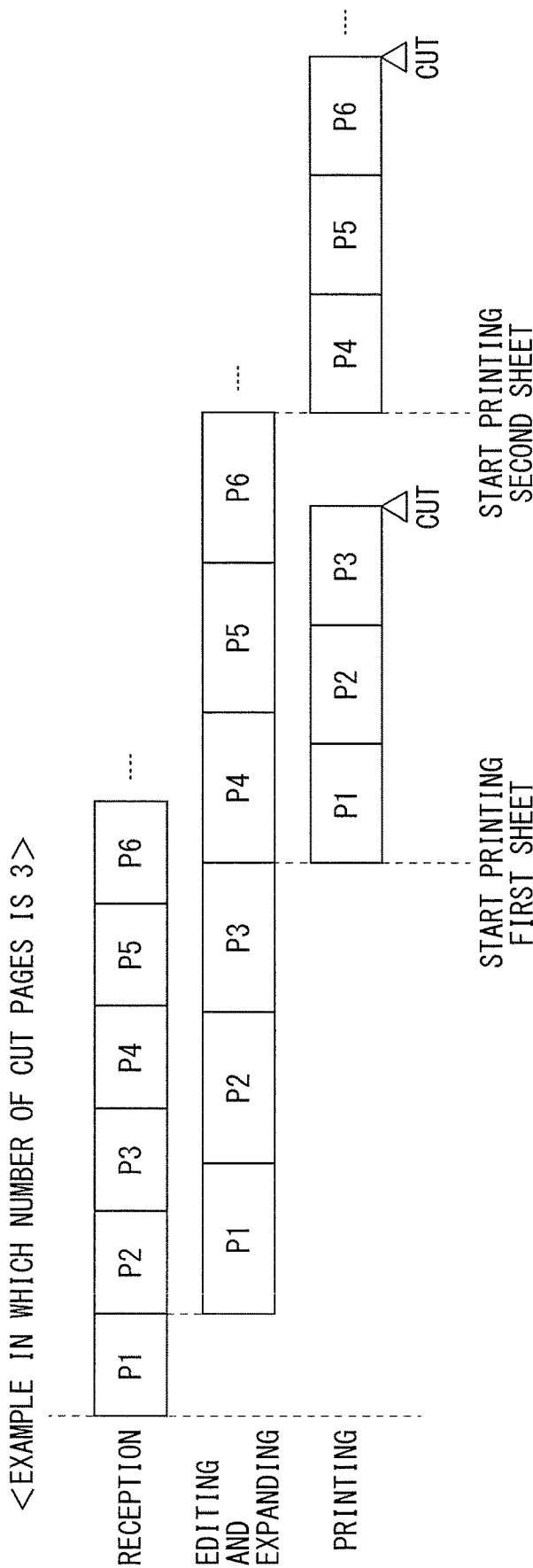
FIG. 4 is a diagram for describing a specific example of the print execution in the image forming apparatus according to one example embodiment.

In the image forming apparatus according to one example embodiment of the technology, the print job may include print data corresponding to no less than pages, where the specified number of pages is designated by Nc. The printing controller may temporarily stop the conveyance of the print medium by the conveyor and the execution of the printing by the printing section until second time of the conversion of the print data into the image data corresponding to the specified number of pages is completed by the image data generator, after first time of the printing of the image corresponding to the specified number of pages in the print job is completed and first time of the cutting of the print medium is completed by the print medium cutter. In this example, the first time of the printing of the image corresponding to the specified number of pages may be execution of printing of P1 to P3, which is illustrated FIG. 4 and will be described later, for example. Thereafter, as illustrated in FIG. 4, for example, the printing controller may temporarily stop the conveyance of the print medium by the conveyor and the execution of the printing by the printing section until a second time of the conversion of the print data into the image data corresponding to the specified number of pages, i.e., P4 to P6, is completed.

In the image forming apparatus according to one example embodiment of the technology, the print job may include information on the specified number of pages. The determiner may acquire the information on the specified number of pages from the print job and transmit the acquired information on the specified number of pages to the printing controller before the conversion of the print data into the image data is performed by the image data generator.

[1.1 Configuration]

FIG. 1 illustrates an example of a configuration of a control system in the image forming apparatus 22 according to a first example embodiment of the technology.

The image forming apparatus 22 may include a data receiver 23, an editing and expanding processor 24, a main controller 25, a cut specification determiner 26, a large-capacity storage device 27, a printing processor 28, and a mechanism controller 29.

The image forming apparatus 22 may be, for example, an electrophotographic printer having such a configuration as an exemplary configuration illustrated in FIG. 2. The image forming apparatus 22 may be, for example, a printing apparatus that performs printing on a continuous belt-like print medium, such as long paper or continuous paper, through an electrophotographic scheme to form a monochrome or color image on the print medium.

The data receiver 23 may receive a print job transmitted from an external higher device 21. The print job may include print data corresponding to a plurality of pages. In addition, the print job may include information specifying a cut type. The information specifying the cut type may indicate, for example, that the print medium is to be cut at the end of the print job or that the print medium is to be cut at a specified page. The information specifying the cut type may include information on the number of cut pages (Nc).

The main controller 25 may control the image forming apparatus 22 as a whole. The main controller 25 may instruct the printing processor 28 to execute a printing process. In addition, the main controller 25 may instruct the mechanism controller 29 to execute a print medium conveying process.

The editing and expanding processor 24 may convert, or edit and expand, the print data included in the print job received by the data receiver 23 into image data, i.e., raster data, directed to executing actual printing. The editing and expanding processor 24 may also store the image data into the large-capacity storage device 27.

The cut specification determiner 26 may be a controller that determines a cut specification set in the print data or in a printing apparatus. The cut specification determiner 26 may determine the cut specification before the editing and expanding processor 24 performs a editing and expanding process.

The printing processor 28 may form the image data edited and expanded by the editing and expanding processor 24, for example, onto a photosensitive drum and execute print control.

The mechanism controller 29 may control a mechanism such as a motor, not illustrated, for conveying the print medium.

FIG. 2 illustrates an example of a configuration of a mechanism system in the image forming apparatus 22 according to the first example embodiment.

In the descriptions of the present example embodiment, the image forming apparatus 22 may be a color printer of an intermediate transfer scheme that forms a color image.

The image forming apparatus 22 may include a plurality of image forming units 1a, 1b, 1c, 1d, and 1e; a transfer belt 2; print medium feed detectors 3a and 3b; a print medium leading-end write-start detector 4; a discharge detector 5; print medium conveyors 6a, 6b, 6c, and 6d; a secondary transfer section 7; a fixing section 8; and a cutter 9.

The plurality of image forming units 1a, 1b, 1c, 1d, and 1e may each form an image in a different color and transfer the formed color image onto the transfer belt 2.

The print medium feed detectors 3a and 3b and the discharge detector 5 may detect the presence of a print medium or a print medium conveyance abnormality, for example.

The images transferred onto the transfer belt 2 by the image forming units 1a, 1b, 1c, 1d, and 1e may be transferred, in the secondary transfer section 7, onto a print medium conveyed by the print medium conveyors 6a, 6b, 6c, and 6d. The images transferred onto the print medium may thereafter be conveyed to the fixing section 8 and fixed to the print medium.

In a case where a cut specification is set, the trailing end of the print medium may be cut by the cutter 9. The cutter 9 may be disposed upstream in the conveying direction from the position where the printing of the image onto the print medium is executed, e.g., the position of the secondary transfer section 7.

[1.2 Operation]

In the image forming apparatus 22, a specified cut unit of pages, e.g., the number of cut pages, may be determined, and editing and expanding of print data and printing may be carried out in accordance with the determined unit. In the image forming apparatus 22, printing may be started upon printable page data corresponding to the number of cut pages or more having been secured. This configuration reduces the time spent before the printing is started and the time it takes to complete the printing, as compared to the case where the printing is started upon the completion of the entire printing preparation.

[Control Flow of Printing Execution]

Figure 3:
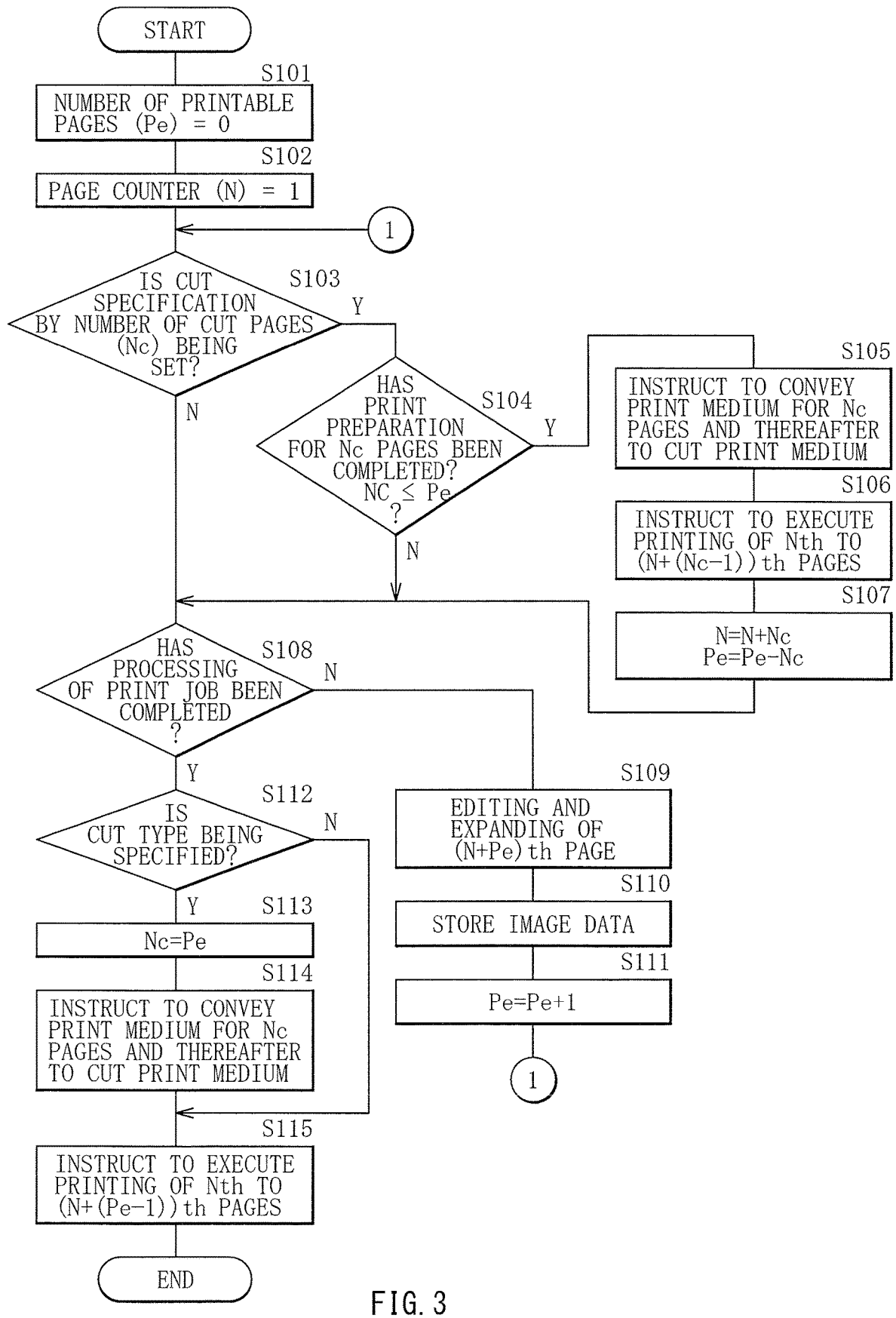
FIG. 3 is a flowchart illustrating an example of a control flow of print execution in the image forming apparatus according to one example embodiment.

FIG. 3 illustrates an example of a control flow of printing execution in the image forming apparatus 22.

First, upon the data receiver 23 receiving print data from the higher device 21, the main controller 25 may initialize a counter for the number of printable pages (Pe) and a page counter (N) (step S101 and step S102). In this example, the number of printable pages (Pe) may be the number of pages that have become printable as the editing and expanding processor 24 has completed editing and expanding to create image data. The page counter (N) may be directed to managing printed pages.

Next, the cut specification determiner 26 may determine the cut type for the print data received by the data receiver 23. The cut type may be specified, for example, by the print data received from the higher device 21 or by the settings of the image forming apparatus 22. The cut type may indicate, for example, that no cut be made in the print medium, that the print medium be cut at the end of the print job, or that the print medium be cut at a specified page. In this example, the cut specification determiner 26 may determine whether a cut specification at a specified page, i.e., the number of cut pages (Nc), is being set as the cut type (step S103).

In a case where the cut specification determiner 26 determines that the cut specification is being set by the specified page (Y in step S103), the main controller 25 may thereafter determine whether a print preparation for Nc pages has been completed (step S104). In one example, the main controller 25 may determine whether the number of printable pages (Pe) has reached or exceeded the number of cut pages (Nc), i.e., whether Nc≤Pe holds.

In a case where the main controller 25 determines that the number of printable pages (Pe) is smaller than the number of cut pages (Nc) (N in step S104), the main controller 25 may thereafter determine whether the editing and expanding processor 24 has completed processing of the print job (step S108). In a case where the main controller 25 determines that the editing and expanding processor 24 has not completed the processing of the print job (N in step S108), in other words, in a case where the main controller 25 determines that there remains print data of a page for which the editing and expanding processor 24 has not completed the editing and expanding process, the editing and expanding processor 24 may edit and expand the print data of an (N+Pe)th page into image data (step S109). Thereafter, the editing and expanding processor 24 may store the edited and expanded image data into the large-capacity storage device 27 (step S110). Thereafter, the main controller 25 may update the counter for the number of printable pages (Pe) (step S111) and return to the process in step S103.

In a case where the main controller 25 determines in step S104 that the number of printable pages (Pe) has reached or exceeded the number of cut pages (Nc) and that the print preparation for the Nc pages has been completed (Y in step S104), the main controller 25 may instruct the mechanism controller 29 to convey the print medium for the Nc pages and thereafter to cut the print medium with the cutter 9 (step S105). Thereafter, the main controller 25 may instruct the printing processor 28 and the mechanism controller 29 to execute printing of the image data for pages starting from the Nth page to the (N+(Nc−1))th page stored in the large-capacity storage device 27 (step S106). Thereafter, the main controller 25 may update the page counter (N) for the printed pages by adding the number of pages for which the print execution has been instructed, i.e., by adding the number of cut pages (Nc) (N=N+Nc). In addition, the main controller 25 may update the number of printable pages (Pe) by subtracting the number of cut pages (Nc) for which the print execution has been instructed from the number of printable pages (Pe) (Pe=Pe−Nc) (step S107).

In a case where the main controller 25 determines in step S108 that the processing of the print job has been completed (Y in step S108), in other words, in a case where the main controller 25 determines in step S108 that the editing and expanding process of the print data corresponding to all of the pages included in the print job has been completed, the cut specification determiner 26 may thereafter determine whether the cut type is being specified (step S112).

In a case where the cut specification determiner 26 determines that the cut specification is being set (Y in step S112), the main controller 25 may thereafter update the number of cut pages (Nc) with the number of printable pages (Pe) (Nc=Pe) (step S113). Thereafter, the main controller 25 may instruct the mechanism controller 29 to convey the print medium for the Nc pages, i.e., for the Pe pages leading to the end of the print job, and thereafter to cut the print medium with the cutter 9 (step S114). Thereafter, the main controller 25 may instruct the printing processor 28 and the mechanism controller 29 to execute printing of the image data for pages starting from the Nth page to the (N+(Pe−1))th page (step S115), and the process may end.

[Specific Example of Printing Execution]

FIG. 4 illustrates a specific but non-limiting example of printing execution in the image forming apparatus 22. FIG. 4 illustrates an example of processing time and processing timing concerning a receiving process of print data included in a print job performed by the data receiver 23, an editing and expanding process of the print data performed by the editing and expanding processor 24, and a printing process of the print data performed by the printing processor 28 and the mechanism controller 29.

FIG. 4 illustrates an example in which the number of cut pages (Nc) is 3. In this case, upon the editing and expanding processor 24 completing the editing and expanding of the print data corresponding to the number of cut pages (Nc), i.e., for P3, or the third page, the main controller 25 may instruct the mechanism controller 29 to convey the print medium for three pages and then to cut the print medium with the cutter 9 (step S105 of FIG. 3). In addition, the main controller 25 may instruct the printing processor 28 and the mechanism controller 29 to execute printing of the image data corresponding to P1 to P3, i.e., the first sheet (step S106 of FIG. 3).

While the execution of printing of the image data corresponding to P1 to P3 is executed, the editing and expanding processor 24 may continue with the editing and expanding of the print data. Thereafter, in a case where it is determined again that the number of printable pages (Pe) has reached or exceeded the number of cut pages (Nc) (Y in step S104 of FIG. 3), the main controller 25 may instruct the printing processor 28 and the mechanism controller 29 to execute the printing of the image data corresponding to P4 to P6, i.e., the second sheet (step S106 of FIG. 3). At this point, in a case where the print execution of the image data corresponding to P4 to P6 is instructed before the image corresponding to P3 is formed on the transfer belt 2, it is possible to continuously print the second sheet following the printing of the first sheet. In a case where no instruction for print execution is made before the image corresponding to P3 is formed on the transfer belt 2, after P3 is cut, the mechanism controller 29 may stop the conveyor 6a until the print execution for P4 is instructed.

[1.3 Example Effects]

As described above, according to the present example embodiment, the printing section is caused to start the execution of the printing of the image corresponding at least to the specified number of pages, after the conversion of the print data into the image data corresponding at least to the specified number of pages is completed and before the conversion of the print data into the image data corresponding to all of the pages included in the print job is completed. Hence, it is possible to reduce the time required for printing while suppressing an overrun in the print medium conveyance. In other words, the printing section is caused to stand by for the execution of the printing of the image corresponding at least to the specified number of pages, until the conversion of the print data into the image data corresponding at least to the specified number of pages is completed and before the conversion of the print data into the image data corresponding to all of the pages included in the print job is completed. Hence, it is possible to reduce the time required for printing while suppressing an overrun in the print medium conveyance.

According to the present example embodiment, the number of pages necessary by the start of the printing is determined, and the printing is allowed to start at timing at which the print preparation for the determined number of pages is completed. This makes it possible to reduce the time spent before the printing is started and the overall time it takes to complete the printing, as compared to the case where the printing is started upon the completion of the entire printing preparation.

2. Second Example Embodiment

Next, an image forming apparatus according to a second example embodiment of the technology will be described. In the following, components that are substantially the same as those of the image forming apparatus according to the first example embodiment described above are given identical reference characters, and descriptions thereof will be omitted as appropriate.

[2.0 Overview]

An image forming apparatus according to one example embodiment of the technology may further include a copying controller that makes a specified number of copies of the image data generated by the image data generator. The printing controller may cause the printing section to start the execution of the printing of the image corresponding at least to the specified number of pages on a condition that total number of pages including number of pages of the image data generated by the image data generator and number of pages of the image data copied by the copying controller has reached or exceeded the specified number of pages.

Figure 5:
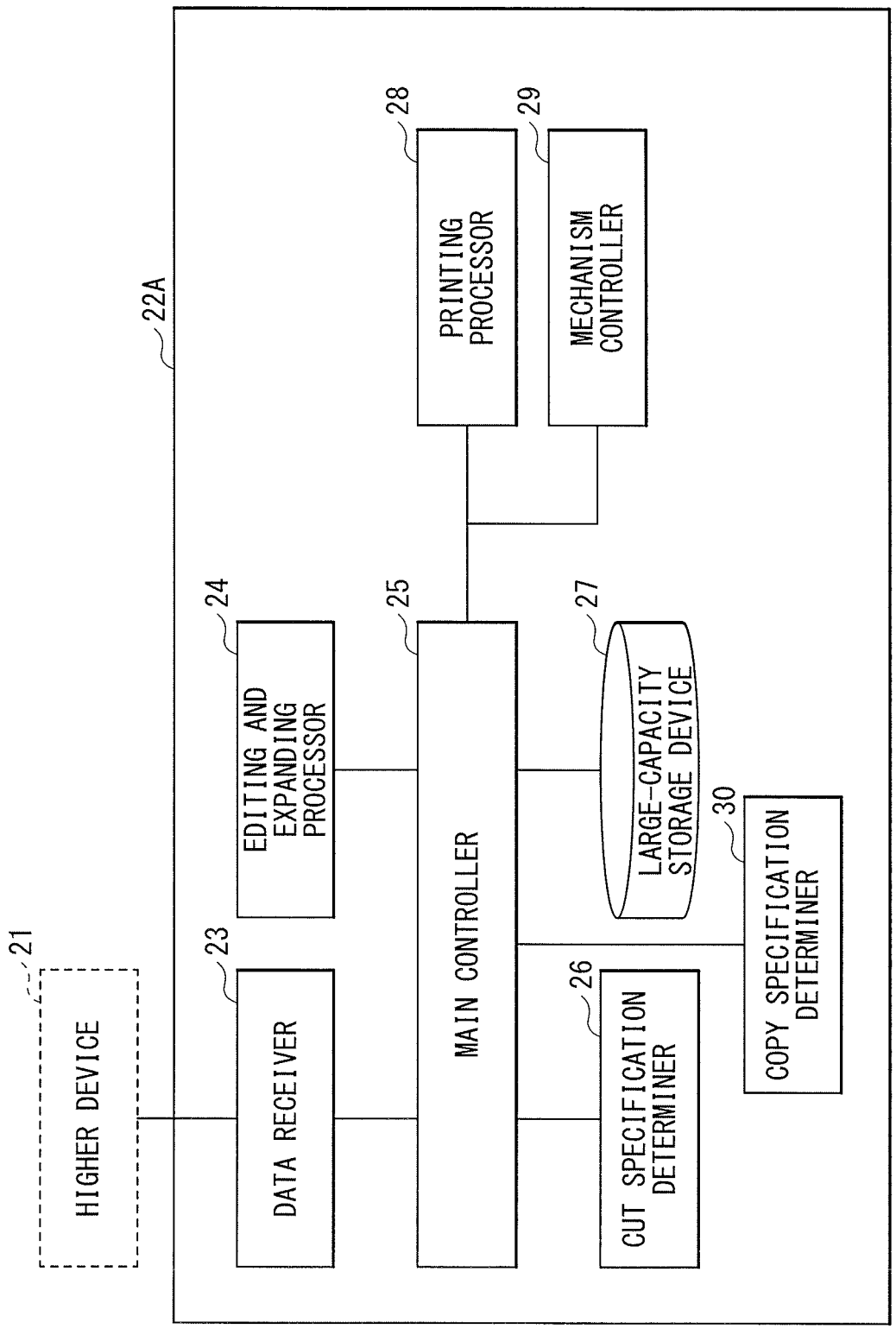
FIG. 5 is a block diagram illustrating an example of a configuration of a control system in an image forming apparatus according to one example embodiment.

The image forming apparatus according to one example embodiment of the technology may be embodied, as a specific but non-limiting example, by an image forming apparatus 22A, which is illustrated in FIG. 5 and will be described later. The copying controller may be embodied, as a specific but non-limiting example, by a copy specification determiner 30, which is illustrated in FIG. 5 and will be described later.

[2.1 Configuration]

FIG. 5 illustrates an example of a configuration of a control system in the image forming apparatus 22A according to a second example embodiment of the technology.

The image forming apparatus 22A may have a configuration in which the copy specification determiner 30 is added to the configuration of the image forming apparatus 22 illustrated in FIG. 1.

The copy specification determiner 30 may be a controller directed to determining of a copy specification. The copy specification determiner 30 may duplicate image data created on the basis of information on the copy specification set in a print job or in the image forming apparatus 22A and information on the number of cut pages (Nc) determined by the cut specification determiner 26 and may instruct the printing processor 28 to perform printing.

[2.2 Operation]

In the image forming apparatus 22A, printing may be started upon data corresponding to printable pages that are no less than the number of cut pages having been secured, in consideration of the number of pages to be duplicated through copying.

[Control Flow of Printing Execution]

Figure 6:
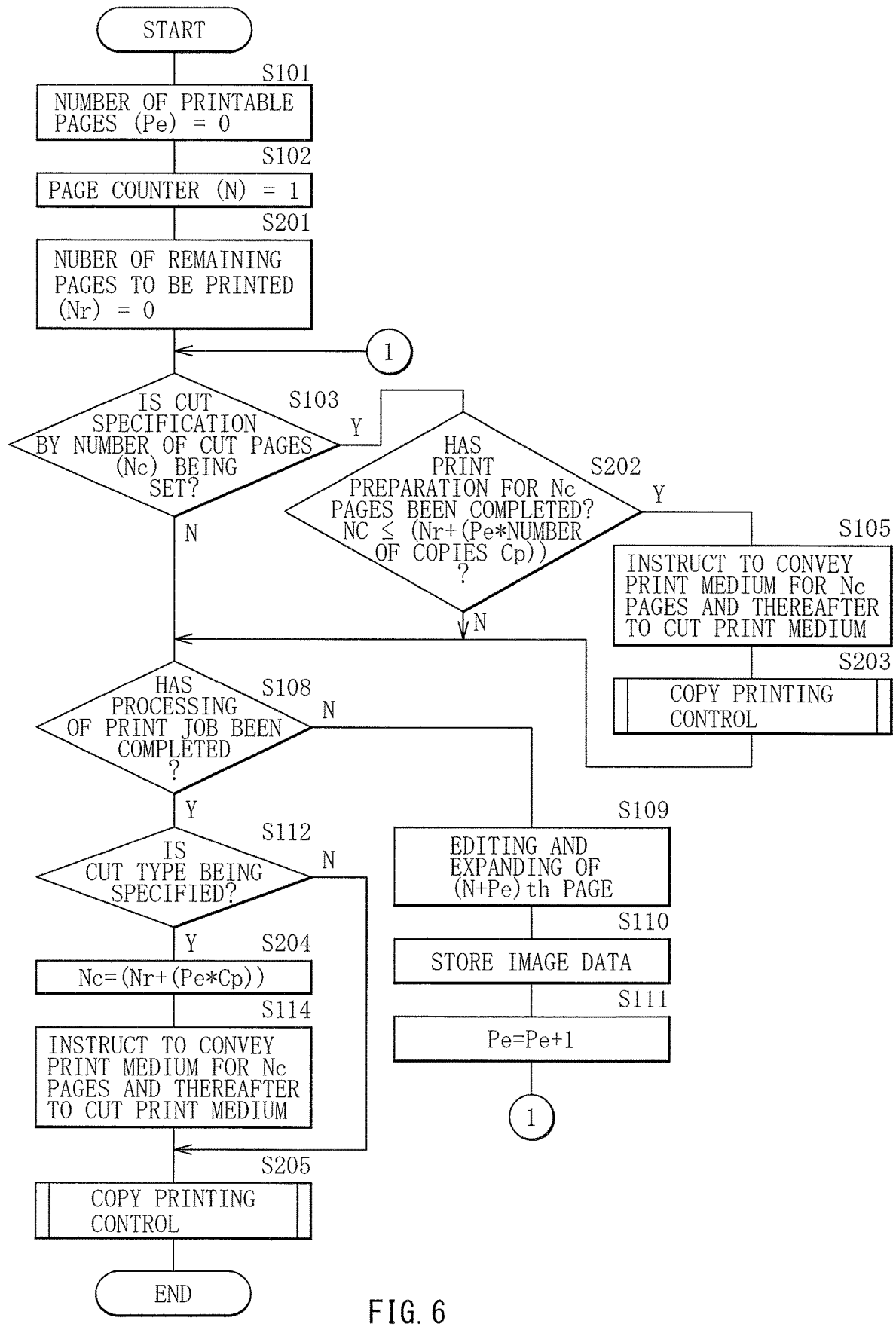
FIG. 6 is a flowchart illustrating an example of a control flow of print execution in the image forming apparatus according to one example embodiment.

FIG. 6 illustrates an example of a control flow of print execution in the image forming apparatus 22A. In the following descriptions, processes similar to those in the control flow illustrated in FIG. 3 are given identical step numbers, and descriptions thereof will be omitted, as appropriate.

In the control flow illustrated in FIG. 6, a process of a counter that manages the number of remaining pages to be printed (Nr) and a process of copy printing control are added to the control flow illustrated in FIG. 3.

First, upon the data receiver 23 receiving print data from the higher device 21, the main controller 25 may initialize the counter for the number of printable pages (Pe) and the page counter (N) (step S101 and step S102). Furthermore, the main controller 25 may initialize the counter that manages the number of remaining pages to be printed (Nr) (step S201). The counter for the number of remaining pages to be printed (Nr) may be updated through a process within the copy printing control, which will be described later.

In the control flow illustrated in FIG. 3, the main controller 25 may determine in step S104 whether the print preparation for the Nc pages has been completed on the basis of the number of printable pages (Pe). In contrast, in the control flow illustrated in FIG. 6, the main controller 25 may determine whether the print preparation for the Nc pages has been completed on the basis of the number of print execution pages obtained by multiplying the number of printable pages (Pe) by the number of copies (Cp) and adding the number of remaining pages to be printed (Nr) to the product, as in the following expression (step S202).

$$Nc \leq (Nr + (Pe * \text{the number of copies } Cp))$$

Similarly, in the control flow illustrated in FIG. 3, the main controller 25 may update the number of cut pages (Nc) with the number of printable pages (Pe) in step S113 (Nc=Pe). In contrast, in the control flow illustrated in FIG. 6, the main controller 25 may update the number of cut pages (Nc) with the number of print execution pages (Nr+(Pe*the number of copies Cp)) (Nc=Nr+(Pe*Cp)) (step S204).

Furthermore, in place of the process of the print execution instruction in step S106 and step S115 in the control flow illustrated in FIG. 3, in the control flow illustrated in FIG. 6, the print execution instruction may be carried out mainly through the process of copy printing control by the copy specification determiner 30 (step S203 and step S205).

Figure 7:
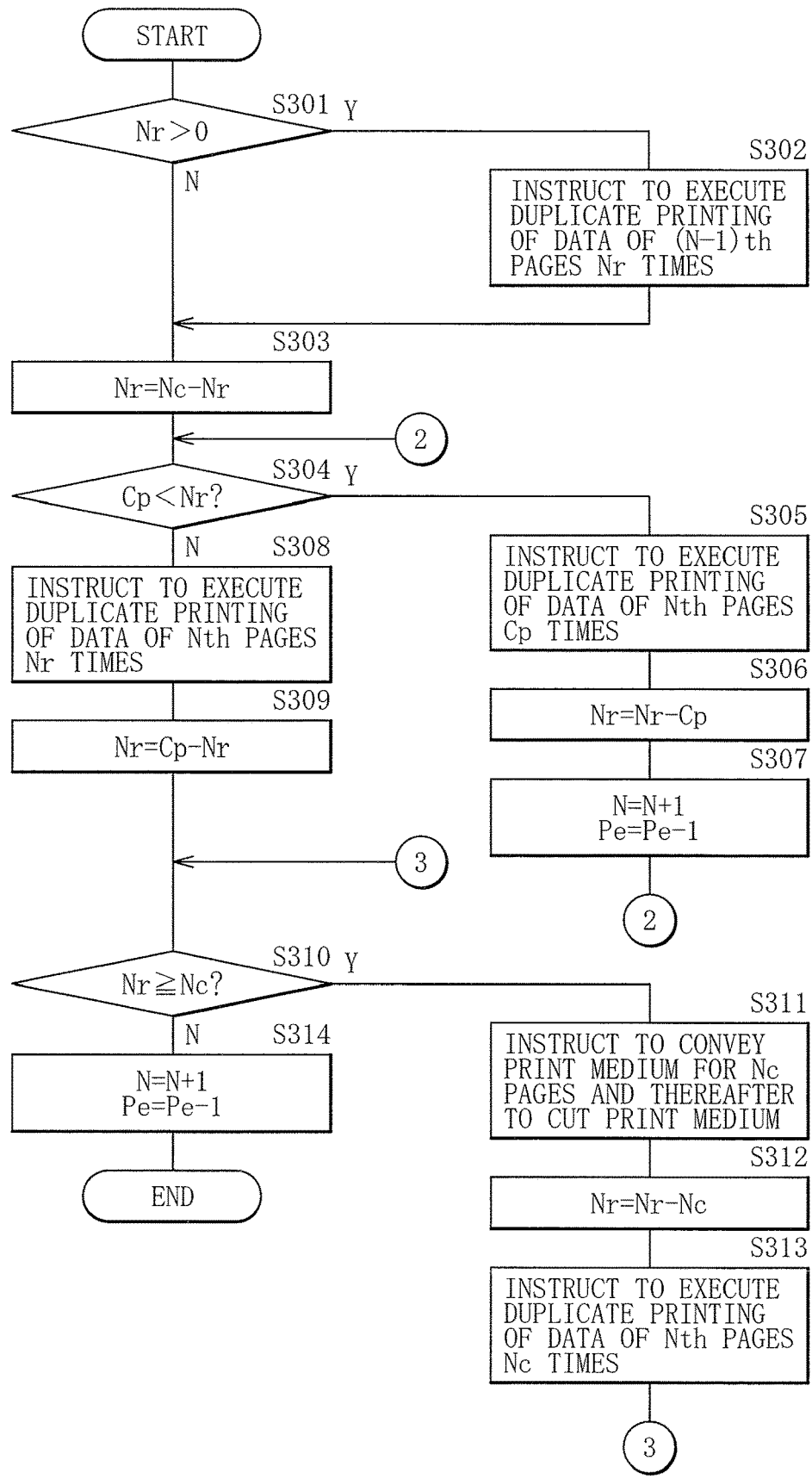
FIG. 7 is a flowchart illustrating an example of a control flow of copy printing control in the control flow illustrated in FIG. 6.

FIG. 7 illustrates an example of a control flow, or a subroutine, of the copy printing control in step S203 and step S205 of the control flow illustrated in FIG. 6.

First, the copy specification determiner 30 may determine whether there is a remaining page to be printed (Nr) in the copy printing of a previous page, i.e., whether Nr>0 holds (step S301). In a case where the copy specification determiner 30 determines that Nr>0 holds and that the copy printing of the previous page has not been completed (Y in step S301), the copy specification determiner 30 may instruct the printing processor 28 and the mechanism controller 29 to execute duplicate printing of the data of the previous page, i.e., the (N−1)th page, for the number of times specified in the number of remaining pages to be printed (Nr) (step S302).

Thereafter, the copy specification determiner 30 may update the number of remaining pages to be printed (Nr) by subtracting the number of remaining pages to be printed (Nr) for which the print instruction has been completed from the number of cut pages (Nc) (Nr=Nc−Nr) (step S303).

Thereafter, the copy specification determiner 30 may compare the number of copies (Cp) with the number of remaining pages to be printed (Nr) and determine whether the number of copies (Cp) is smaller than the number of remaining pages to be printed (Nr), i.e., whether Cp<Nr holds (step S304). In a case where the copy specification determiner 30 determines that the number of copies (Cp) is smaller than the number of remaining pages to be printed (Nr) (Y in step S304), the copy specification determiner 30 may instruct the printing processor 28 and the mechanism controller 29 to execute duplicate printing of the image data of the Nth page for Cp times (step S305). Thereafter, the copy specification determiner 30 may update the number of remaining pages to be printed (Nr) with a result obtained by subtracting the number of copies (Cp) from the current number of remaining pages to be printed (Nr) (Nr=Nr−Cp) (step S306). In addition, the copy specification determiner 30 may update the page counter (N) and the number of printable pages (Pe) (N=N+1, Pe=Pe+1) (step S307) and return to the process in step S304.

In a case where the copy specification determiner 30 determines that the number of copies (Cp) is no smaller than the number of remaining pages to be printed (Nr) (N in step S304), the copy specification determiner 30 may instruct the printing processor 28 and the mechanism controller 29 to execute duplicate printing of the image data of the Nth page for Nr times (step S308). Thereafter, the copy specification determiner 30 may update the number of remaining pages to be printed (Nr) with a result obtained by subtracting the current number of remaining pages to be printed (Nr) from the number of copies (Cp) (Nr=Cp−Nr) (step S309). The copy specification determiner 30 may update the number of remaining pages to be printed (Nr) to 1 after issuing an instruction for duplicate printing of three pages in a case where the number of copies (Cp) is 4 and the number of remaining pages to be printed (Nr) is 3, for example.

The copy specification determiner 30 may further compare the number of cut pages (Nc) with the number of remaining pages to be printed (Nr) and determine whether the number of remaining pages to be printed (Nr) is no smaller than the number of cut pages (Nc), i.e., whether Nr≥Nc holds (step S310). In a case where the copy specification determiner 30 determines that the number of remaining pages to be printed (Nr) is no smaller than the number of cut pages (Nc) (Y in step S310), in other words, in a case where it is possible to print an additional plurality of sheets with the copy specification of the image data corresponding to a single page of the Nth page, the copy specification determiner 30 may instruct the mechanism controller 29 to convey the print medium for the Nc pages and thereafter to cut the print medium with the cutter 9 (step S311). Thereafter, the copy specification determiner 30 may update the number of remaining pages to be printed (Nr) with a result obtained by subtracting the number of cut pages (Nc) from the current number of remaining pages to be printed (Nr) (Nr=Nr−Nc) (step S312). Thereafter, the copy specification determiner 30 may instruct the printing processor 28 and the mechanism controller 29 to execute duplicate printing of the image data of the Nth page for Nc times (step S313). With this operation, for example, in a case where the number of copies (Cp) is 10, the number of cut pages (Nc) is 3, and the number of remaining pages to be printed (Nr) is 1 in step S304, the Nth page may be printed once in step S308 first, and the number of remaining pages to be printed (Nr) may be updated to 9 in step S309. Thereafter, in steps S310 to S313, three sheets each having the number of cut pages of 3 may be printed through the duplicate printing of the page data of the Nth page, and the number of remaining pages to be printed (Nr) may be updated to 0.

In a case where the copy specification determiner 30 determines that the number of remaining pages to be printed (Nr) is smaller than the number of cut pages (Nc) (N in step S310), the copy specification determiner 30 may update the page counter (N) and the number of printable pages (Pe) (N=N+1, Pe=Pe+1) (step S314) and end the copy printing control.

[Specific Example of Printing Execution]

Figure 8:
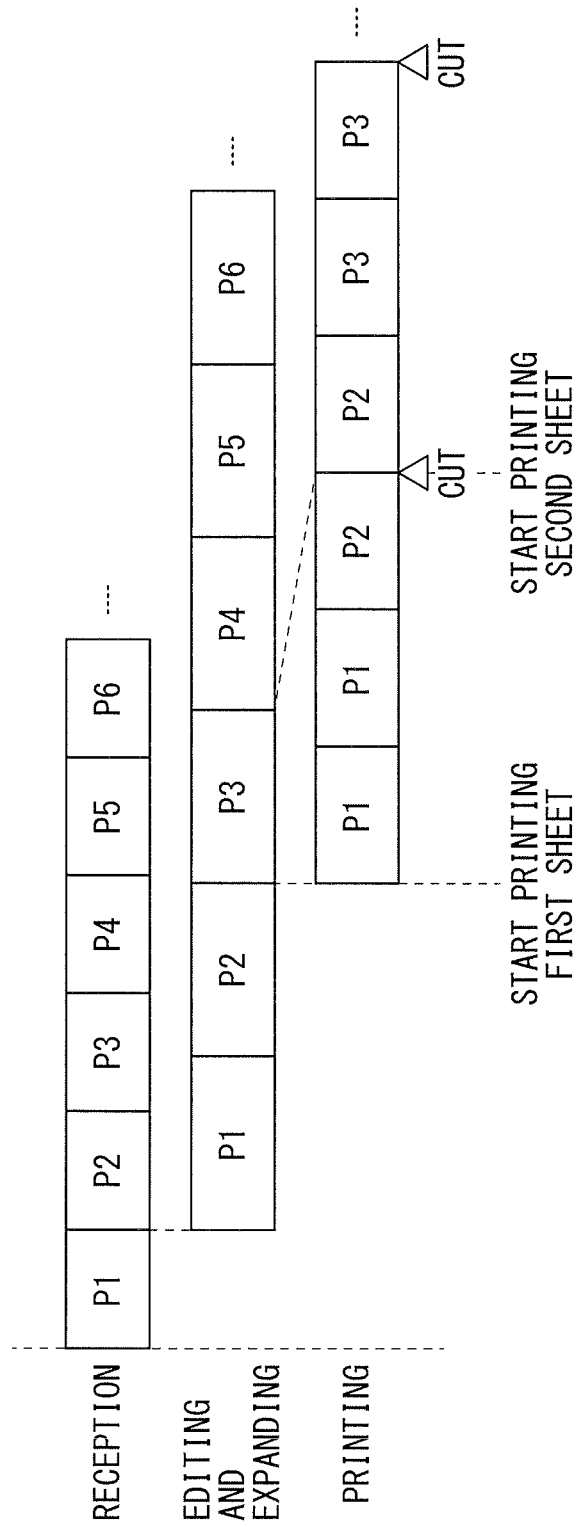
FIG. 8 is a diagram for describing a specific example of the print execution in the image forming apparatus according to one example embodiment.

FIG. 8 illustrates a specific but non-limiting example of printing execution, i.e., copy printing execution, in the image forming apparatus 22A. FIG. 8 illustrates an example of processing time and processing timing concerning a receiving process of print data included in a print job performed by the data receiver 23, an editing and expanding process of the print data performed by the editing and expanding processor 24, and a printing process of the print data performed by the printing processor 28 and the mechanism controller 29.

FIG. 8 illustrates an example in which the number of copies (Cp) is 2 and the number of cut pages (Nc) is 3. In this case, upon the editing and expanding of print data of up to P2, i.e., the second page, being completed, the copy specification determiner 30 may issue an instruction indicating that the print medium be cut after being conveyed for three pages and that the printing of the first sheet be executed by making two duplicate pages of P1 and no duplicate page of P2 from the image data corresponding to P1 and P2. Furthermore, upon the editing and expanding of the print data of P3, i.e., the third page, being completed, the copy specification determiner 30 may issue an instruction indicating that the printing of the second sheet be executed by making no duplicate page of P2 and two duplicate pages of P3.

[2.3 Example Effects]

As described thus far, according to the present example embodiment, the number of pages necessary by the start of the printing is determined in consideration of duplication of pages through the copy specification with respect to the specified number of cut pages. Hence, in a case where the copy specification is being set, it is possible to further reduce the time spent before the printing is started.

Other configurations, operations, and effects may be substantially similar to those of the image forming apparatus 22 according to the first example embodiment described above.

3. Other Example Embodiments

The technology of the disclosure is not limited to the descriptions of the foregoing example embodiments, and various modifications are possible.

For example, an example in which the technology of the disclosure is applied to an electrophotographic printer has been described in the foregoing example embodiments. Alternatively, it is possible to apply the technology to an image forming apparatus that has difficulty in stopping instantly during printing, allows for printing on a long print medium, and operates on the basis of a concept of a page.

It is possible to achieve at least the following configurations from the above-described example embodiments of the technology.

(1)

An image forming apparatus including:

an image data generator that performs, sequentially on a page basis, conversion of print data corresponding to a plurality of pages included in a print job into image data;

a conveyor that conveys, in a predetermined conveying direction, a print medium on which printing of the image data corresponding to the plurality of pages is performed;

a determiner that determines a specified number of pages;

a print medium cutter that cuts the print medium conveyed by the conveyor into print media for each of the specified number of pages;

a printing section that performs, on the print medium conveyed by the conveyor, printing of an image that is based on the image data; and a printing controller that causes the printing section to start execution of the printing of the image corresponding at least to the specified number of pages, after the conversion of the print data into the image data corresponding at least to the specified number of pages is completed by the image data generator and before the conversion of the print data into the image data corresponding to all of pages included in the print job is completed by the image data generator.

(2)

The image forming apparatus according to (1), wherein the print medium cutter cuts the print medium upstream in the predetermined conveying direction from a position where the printing of the image onto the print medium is executed by the printing section.

(3)

The image forming apparatus according to (2), wherein the print job includes print data corresponding to no less than pages, where the specified number of pages is designated by Nc, and the printing controller temporarily stops the conveyance of the print medium by the conveyor and the execution of the printing by the printing section until second time of the conversion of the print data into the image data corresponding to the specified number of pages is completed by the image data generator, after first time of the printing of the image corresponding to the specified number of pages in the print job is completed and first time of the cutting of the print medium is completed by the print medium cutter.

(4)

The image forming apparatus according to any one of (1) to (3), wherein the print job includes information on the specified number of pages, and the determiner acquires the information on the specified number of pages from the print job and transmits the acquired information on the specified number of pages to the printing controller before the conversion of the print data into the image data is performed by the image data generator.

(5)

The image forming apparatus according to any one of (1) to (4), further including a copying controller that makes a specified number of copies of the image data generated by the image data generator, wherein the printing controller causes the printing section to start the execution of the printing of the image corresponding at least to the specified number of pages on a condition that total number of pages including number of pages of the image data generated by the image data generator and number of pages of the image data copied by the copying controller has reached or exceeded the specified number of pages.

(6)

An image forming apparatus including:

an image data generator that performs, sequentially on a page basis, conversion of print data corresponding to a plurality of pages included in a print job into image data;

a conveyor that conveys, in a predetermined conveying direction, a print medium on which printing of the image data corresponding to the plurality of pages is performed;

a determiner that determines a specified number of pages;

a print medium cutter that cuts the print medium conveyed by the conveyor into print media for each of the specified number of pages;

a printing section that performs, on the print medium conveyed by the conveyor, printing of an image that is based on the image data; and a printing controller that causes the printing section to stand by for execution of the printing of the image corresponding at least to the specified number of pages, until the conversion of the print data into the image data corresponding at least to the specified number of pages is completed by the image data generator and before the conversion of the print data into the image data corresponding to all of pages included in the print job is completed by the image data generator.

With the image forming apparatus according to one embodiment of the technology, the printing section is caused to start the execution of the printing of the image corresponding at least to the specified number of pages, after the conversion of the print data into the image data corresponding at least to the specified number of pages is completed and before the conversion of the print data into the image data corresponding to all of the pages included in the print job is completed. Hence, it is possible to reduce the time required for printing while suppressing an overrun in the print medium conveyance.

With the image forming apparatus according to one embodiment of the technology, the printing section is caused to stand by for the execution of the printing of the image corresponding at least to the specified number of pages, until the conversion of the print data into the image data corresponding at least to the specified number of pages is completed and before the conversion of the print data into the image data corresponding to all of the pages included in the print job is completed. Hence, it is possible to reduce the time required for printing while suppressing an overrun in the print medium conveyance.

Each of the main controller 25 illustrated in FIG. 1, the cut specification determiner 26 illustrated in FIG. 1, the mechanism controller 29 illustrated in FIG. 1, and the copy specification determiner 30 illustrated in FIG. 5 is implementable by circuitry that includes at least one application specific integrated circuit (ASIC), at least one semiconductor integrated circuit, and/or at least one field programmable gate array (FPGA). Non-limiting example of the at least one semiconductor integrated circuit may include at least one processor such as a central processing unit (CPU). At least one processor is configurable to perform all or a part of functions of each of the main controller 25 illustrated in FIG. 1, the cut specification determiner 26 illustrated in FIG. 1, the mechanism controller 29 illustrated in FIG. 1, and the copy specification determiner 30 illustrated in FIG. 5, by reading instructions from at least one machine readable tangible non-transitory medium. Such a medium may take many forms. Non-limiting examples of the form of such a medium may include any type of magnetic medium such as a hard disk, any type of optical medium such as a CD and a DVD, any type of semiconductor memory (i.e., semiconductor circuit) such as a volatile memory and a non-volatile memory. Non-limiting examples of the volatile memory may include a DRAM and a SRAM. Non-limiting examples of the nonvolatile memory may include a ROM and a NVRAM. The ASIC is an integrated circuit (IC) customized to perform all or a part of the functions of each of the main controller 25 illustrated in FIG. 1, the cut specification determiner 26 illustrated in FIG. 1, the mechanism controller 29 illustrated in FIG. 1, and the copy specification determiner 30 illustrated in FIG. 5. The FPGA is an integrated circuit designed to be configured after manufacturing in order to perform all or a part of the functions of each of the main controller 25 illustrated in FIG. 1, the cut specification determiner 26 illustrated in FIG. 1, the mechanism controller 29 illustrated in FIG. 1, and the copy specification determiner 30 illustrated in FIG. 5.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive.

What is claimed is:

1. An image forming apparatus comprising:
an image data generator that performs, sequentially on a page basis, conversion of print data corresponding to a plurality of pages included in a print job into image data;
a conveyor that conveys, in a predetermined conveying direction, a print medium on which printing of the image data corresponding to the plurality of pages is performed;
a determiner that determines a specified number of cut pages, defined as a number of pages to be cut in the print job;

a print medium cutter that cuts the print medium conveyed by the conveyor into print media for each of the specified number of cut pages;

a printing section that performs, on the print medium conveyed by the conveyor, printing of an image that is based on the image data; and a printing controller that causes the printing section to start execution of the printing of the image corresponding at least to the specified number of cut pages, after the conversion of the print data into the image data corresponding at least to the specified number of cut pages is completed by the image data generator and before the conversion of the print data into the image data corresponding to all of the pages included in the print job is completed by the image data generator, wherein the determiner determines a cut specification, the printing controller causes, when the determiner determines that the cut specification specifies cutting of the print medium at an end of the print job, the printing section to start the execution of the printing of the image data corresponding to all of the pages included in the print job, after the conversion of the print data into the image data corresponding to all of the pages included in the print job is completed by the image data generator, and the printing controller causes, when the determiner determines that the cut specification specifies cutting of the print medium based on the specified number of cut pages that is less than all of the pages included in the print job, the printing section to start the execution of the printing of the image data corresponding at least to the specified number of cut pages, after the conversion of the print data into the image data corresponding at least to the specified number of cut pages is completed by the image data generator and before the conversion of the print data into the image data corresponding to all of the pages included in the print job is completed by the image data generator.

2. The image forming apparatus according to claim 1, wherein the print medium cutter cuts the print medium upstream in the predetermined conveying direction from a position where the printing of the image onto the print medium is executed by the printing section.

3. The image forming apparatus according to claim 2, wherein the specified number of cut pages is designated by Nc, and after a first printing and cutting process in which the printing section has printed the image corresponding to the specified number of cut pages and after the print medium cutter has cut the specified number of cut pages, the printing controller temporarily stops the conveyance of the print medium by the conveyor and the execution of the printing by the printing section until the image data generator generates, a second time, the image data corresponding to the specified number of cut pages.

4. The image forming apparatus according to claim 1, wherein the print job includes information on the specified number of cut pages, and the determiner acquires the information on the specified number of cut pages from the print job and transmits the acquired information on the specified number of cut pages to the printing controller before the conversion of the print data into the image data is performed by the image data generator.

5. The image forming apparatus according to claim 1, further comprising a copying controller that makes a specified number of copies of the image data generated by the image data generator, wherein the printing controller causes the printing section to start the execution of the printing of the image corresponding at least to the specified number of cut pages on a condition that total number of pages including a number of pages of the image data generated by the image data generator and a number of pages of the image data copied by the copying controller has reached or exceeded the specified number of cut pages.

6. An image forming method comprising:

acquiring print data corresponding to a plurality of pages;

determining a specified number of cut pages, defined as a number of pages to be cut;

determining a cut specification defining when the specified number of cut pages is to be cut;

converting, sequentially on a page basis, the print data into image data; and starting execution of printing on a basis of the converted image data, after the converting of the print data into the image data corresponding to the specified number of cut pages is completed and before the converting of the print data into the image data corresponding to all of the pages is completed, wherein when it is determined that the cut specification specifies cutting of the pages at an end of the print job, the method includes starting the execution of the printing of the image data corresponding to all of the pages included in the print job, after the conversion of the print data into the image data corresponding to all of the pages included in the print job is completed, and when the determiner determines that the cut specification specifies cutting of the pages based on the specified number of cut pages that is less than all of the pages included in the print job, the method includes starting the execution of the printing of the image data corresponding at least to the specified number of cut pages, after the conversion of the print data into the image data corresponding at least to the specified number of cut pages is completed and before the conversion of the print data into the image data corresponding to all of the pages included in the print job is completed.

* * * * *